Aug. 4, 1953  M. J. RIBARICH, JR  2,647,648
WHEEL AND TIRE MOUNTING APPLIANCE
Filed March 10, 1948
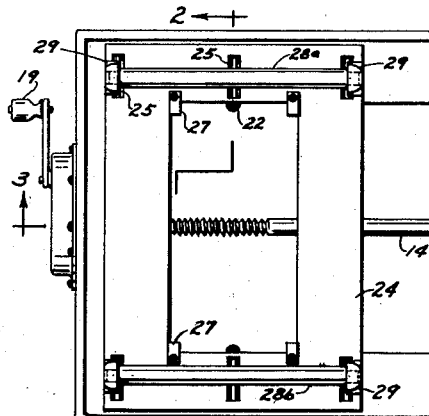
FIG_1
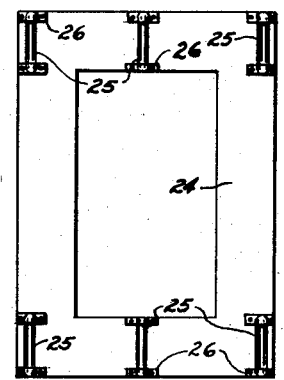
FIG_5
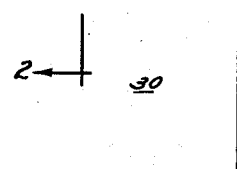
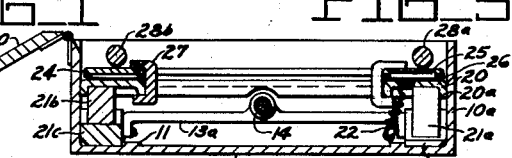
FIG_2
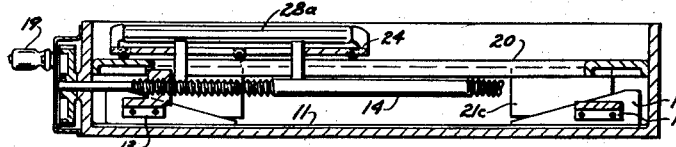
FIG_3
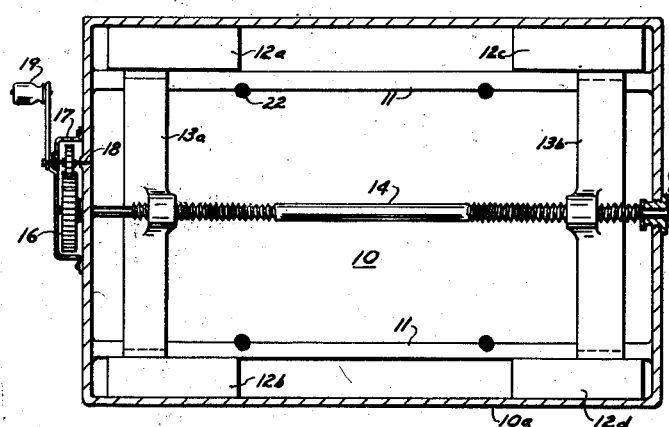
FIG_4
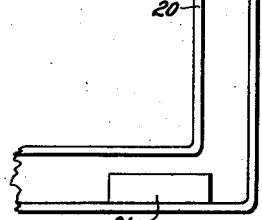
FIG_6
INVENTOR.
MATT J. RIBARICH JR.
BY *Oswald H. Milmore*
His Attorney Patented Aug. 4, 1953

2,647,648

UNITED STATES PATENT OFFICE 2,647,648

WHEEL AND TIRE MOUNTING APPLIANCE

Matt J. Ribarich, Jr., Richmond, Calif.

Application March 10, 1948, Serial No. 14,051

7 Claims. (Cl. 214—331)

This invention relates to materials handling equipment and is, more particularly, concerned with a portable appliance useful in mounting wheels and/or tires on axles and/or wheels, respectively; it may, however, also be applied to the handling of similar circular objects.

Difficulty is frequently experienced by motor vehicle operators, garagemen and others in mounting wheels or tires on vehicles, particularly in the case of heavy truck tires mounted on rims which frequently weigh several hundred pounds. Such wheels or tires can be mounted and dismounted by a single operator only with the greatest of difficulty without special equipment and it is very common for a truck driver to let his truck stand at the spot where a flat tire is experienced and call for assistance. Many modern trucks are provided with hoists of various types to enable the driver to move the spare tire or wheel to or from the storage compartment. However, once the tire or wheel is on the ground the driver is faced with several difficult operations, involving spotting the tire or wheel opposite the proper axle, orienting the tire or wheel about its own axis so as to align the valve stem and/or the bolts, translating the tire or wheel parallel to the axle into position, and of lifting it slightly to align it with the axle. Because of the weight involved and of the friction of the tire or wheel with respect to the ground these operations frequently require forces beyond the strength of one man.

It is an object of this invention to provide a simple handling appliance which will permit a wheel or tire to be mounted or dismounted with less effort than when the methods known heretofore are employed. Specifically, it is an object to provide an appliance whereby one man can mount or dismount a heavy wheel or tire on an axle or wheel, respectively, but is, of course, not limited to such operations or to devices operable by one man, but may be applied for handling very heavy circular objects which otherwise would require a greater expenditure of manual force.

It is a further object to provide a portable wheel and tire mounting or dismounting appliance which is adapted to move the wheel or tire in translation parallel to the axle, to move the wheel or tire vertically, and to permit the wheel or tire to be rotated about its own axis with a minimum of effort.

Still another object is to provide a device of the type described which is simple to construct and does not require the use of machined or closely fitted parts.

Still a further object is to provide a device of the type described which will provide a firm platform so as to be useful on soft, sandy or muddy roadbeds.

For simplifying the description, only tires will be specifically referred to, it being understood that the machine and the method of operation are equally applicable to the mounting of wheels.

According to the present invention, I provide an appliance having a supporting framework adapted to rest on the ground and to be placed partly under the wheel and partly clear of the wheel the tire of which is to be mounted or dismounted. The framework is fitted with an elevator (operable by a suitable mechanism), with a slide movably supported by the elevator for translatory motion parallel to the axle, and with load rotating rollers journalled on the slide, the axes of the rollers being parallel to the direction of said translatory motion. The frame may optionally be provided with a ramp. When the appliance is used for mounting a rimmed tire on an untired wheel the appliance is placed partly beneath the wheel with the direction of translatory motion of the slide parallel to the wheel axle and the slide pulled out, away from the wheel. The wheel is rolled onto the slide (using the ramp, if provided) and rotated about its own axis on the load rotating rollers until properly oriented. The slide is then shifted, thereby translating the rim and tire to the correct position on the wheel. By raising or lowering the elevator the rim can be brought to the exact height required to translate the rim into position on the wheel.

The appliance will be better understood by reference to the accompanying drawings forming a part of this specification and illustrating one preferred embodiment, wherein:

Fig. 1 is a plan view of the appliance;

Fig. 2 is a transverse sectional view taken on line 2—2 of Fig. 1;

Fig. 3 is a longitudinal sectional view, taken on line 3—3 of Fig. 1;

Fig. 4 is a plan view of the base, the elevator and parts supported thereon being removed;

Fig. 5 is a bottom view of the slide; and

Fig. 6 is a fragmentary bottom view of one end of the elevator.

Referring to Fig. 4, the device comprises a base 10 having sides 10a and 10b formed integrally or separately therewith. Longitudinal ribs 11 extend near the sides and provide guides for movable wedges 12a, 12b, 12c and 12d which are slidably mounted for longitudinal movement between the ribs 11 and the sidewalls 10a. The two wedges at each end are rigidly connected by crossbars 13a and 13b having internally threaded enlargements intermediate their ends. The crossbar 13a has right hand threads while the crossbar 13b has left hand threads. A longitudinal drive shaft 14 extends through the threaded holes in the crossbars, being provided with right hand and left hand threads at opposite ends, whereby the crossbars may be separated or brought together by turning the shaft. One end of the drive shaft is freely journalled in each end 10b of the base, being secured against longitudinal motion by suitable retaining means 15 at one end and by a spur gear 16 at the other end. A pinion gear 17 is mounted for driving the gear 16 and is journalled on a shaft 18 provided with a crank 19.

It is evident from the foregoing that as the crank 19 is rotated the shaft 14 is rotated at a reduced speed, thereby moving the crossarms 13a and 13b closer together or farther apart, depending upon the direction in which the crank is turned. The wedges at the opposite ends will thereby be moved longitudinally and correspondingly brought closer together or moved apart. As shown in Fig. 3, the wedges have their inclined, upper faces sloped downwardly toward the midsection of the frame.

Referring to Figs. 1, 2, 3 and 6, an elevator 20 is provided to fit within the sides 10a and ends 10b. It is in the form of a rectangular frame, cut out in the center. It may optionally have stiffening webs or ribs such as, for example, down-turned edges 20a. A fixed wedge 21a, 21b, 21c or 21d is secured near each corner on the lower side of the elevator. These wedges have their upper faces horizontal and in engagement with the elevator, and their lower faces in engagement with the wedges 12a, 12b, 12c and 12d, respectively and inclined to conform therewith. The elevator is urged downwardly to keep the coacting wedges in engagement by four tension springs 22 connected to the ribs 11 and to the elevator, being secured to the latter by pins 23 in depressed pockets in the elevator frame and securing eyes on the springs extending up through holes at the bottom of the pockets.

From the foregoing description it will be seen that as the wedges 12a–12d are moved toward the center section of the frame by rotation of crank 19 the elevator 20 will be lifted because of the relative motion of the engaging wedges. Turning the crank in the opposite direction permits the elevator to descend, urged by gravity and by the force of the springs 22.

Referring to Figs. 1, 2, 3 and 5, a slide 24, in the form of a rectangular frame, is provided with a plurality, e. g., six anti-friction rollers 25, arranged in pairs at opposite sides and secured by securing plates 26 connected by screws to the under side of the slide. The lower faces of the rollers ride on the side portions of the elevator frame 20, and the upper faces extend through slots in the slide, whereby the total height of the appliance may be kept to a minimum. The slide is retained on the elevator by a plurality of U-clamps 27 which are rigidly secured to the upper face of the slide and extend beneath the inner downturned edges 20a of the elevator. For assembly and disassembly these clamps may be unscrewed from the slide, it being in most cases only necessary to loosen one of the four clamps and impart a slight rotation to the slide. A pair of load rotating rollers 28a and 28b are mounted on the slide on opposite sides, with their axes longitudinal, i. e., parallel to the direction of movement of the slide and, hence, perpendicular to the axes of the rollers 25. The rollers 28a and 28b are larger in diameter than the antifriction rollers so as not to indent the yieldable surface of a rubber tire so deeply as to hinder easy turning of the tire. These load rotating rollers are journalled in supports 29.

From the foregoing it is seen that the slide 24 can be translated with respect to the elevator 20 and that the rollers 25, which ride on the hard, smooth upper surface of the elevator, reduce friction to a great extent and permit the slide to be shifted readily. The larger rollers 28a and 28b permit a wheel or tire placed thereon to be rotated about the wheel or tire axis, the periphery thereof extending sometimes into the rectangular hole cut into the slide, as shown in Fig. 2.

I may, optionally, provide a hinged ramp 30 disposed to extend laterally and downward toward the ground when opened in the position shown in Fig. 1, and to be swung to a position over the elevator when closed, i. e., when the appliance is secured for storage. This ramp facilitates moving a tire onto the slide. However, when the appliance is made with a relatively small vertical dimension, e. g., of the order of 2½ inches or less, most tires can be rolled onto the slide even without the ramp.

The invention is founded on the fact that an operator can balance and roll a heavy wheel or tire which he is unable to lift or skid on the ground. With my appliance it is possible to handle such a heavy, circular object by merely balancing and rolling it. The crank 19 is located so that it can be turned with one hand while the wheel or tire is balanced with the other hand.

I claim as my invention:

1. An appliance for moving objects comprising a base, a movable wedge near each corner of said base, the wedges at opposite ends having their faces sloped in opposite directions and each pair of wedges at the same end being similarly disposed, a crossbar connecting each pair of wedges at the same end, an operating shaft having a right-hand threaded engagement with one crossbar and a left-hand threaded engagement with the other crossbar, hand-operable means for rotating said operating shaft, an elevator, a fixed wedge on said elevator for each of said movable wedges having complementary surfaces and resting on said movable wedges, and a slide for said elevator.

2. In combination with the appliance according to claim 1, a plurality of springs connecting said elevator and base and arranged to urge the fixed wedges toward the movable wedges.

3. In combination with the appliance according to claim 1, a pair of load rotating rollers on the slide disposed on opposite sides thereof with their axes parallel to the direction of movement of said slide.

4. An appliance for mounting tires and the like adapted to be used on roads comprising a base adapted to rest on the road, an elevator movable up and down relatively to said base and provided with an elongated track surface, hand operable means for raising said elevator, a slide supported on said track surface and movable longitudinally on said elevator, and load rotating rollers on opposite sides of said slide with their axes parallel to said longitudinal direction of motion of the slide.

5. The appliance according to claim 4 wherein the elevator has its upper surface formed to provide two longitudinal trackways separated by a cut-away portion and the slide has a similar cut-away portion intermediate its sides, whereby a circular object such as a tire resting on said load rotating rollers may extend downwardly beneath the level of the upper part of the elevator.

6. A portable appliance for mounting tires and the like adapted to be used on roads comprising a base adapted to rest on the road; an elevator movable up and down relatively to said base and provided with a pair of transversely spaced, longitudinally extending track surfaces and a longitudinal opening between said track surfaces; hand operable means for raising said elevator; a slide supported on said track surfaces and movable longitudinally on said elevator, said slide having a central cut-away portion disposed over said opening in the elevator to permit a circular object such as a tire resting on said slide to extend downwardly through the slide and into said opening; and a plurality of retaining clamps extending downwardly through said cut-away portion of the slide and into said opening in the elevator, said clamps being fixed to the slide and in slidable engagement with a downwardly facing surface on said elevator.

7. A portable appliance for mounting tires and the like adapted to move a tire in substantially horizontal rectilinear motion at any desired elevation above a roadbed despite surface irregularities and lack of roadbed firmness, comprising: a base adapted to rest on the roadbed; an elevator mounted on said base for up and down movement relatively to the base and provided with a pair of transversely spaced, horizontal track surfaces, said track surfaces being elongated in a longitudinal direction, said elevator having a longitudinal opening between said track surfaces; hand operable means for raising and lowering said elevator and retaining the elevator at any desired elevation relatively to said base; and a slide supported on said track surfaces and guidedly attached to said elevator for longitudinal movement thereon, said slide having a central opening disposed over said longitudinal opening of the elevator and a pair of support portions situated one to each side of the opening to support a tire in upright position in a plane transverse to said longitudinal direction with the convex lowermost part of the tire protruding downwardly beneath said support portions into the opening, said support portions being positioned to support said tire clear of the elevator and base, whereby the slide can be raised and lowered with the elevator to any desired elevation and the slide and a tire thereon can be moved longitudinally at the said desired elevation.

MATT J. RIBARICH, Jr.

References Cited in the file of this patent

UNITED STATES PATENTS

| Number | Name | Date |
|---|---|---|
| 1,414,163 | Anthony | Apr. 25, 1922 |
| 1,535,762 | Brejska | Apr. 28, 1925 |
| 1,647,935 | Scholler | Nov. 1, 1927 |
| 1,794,798 | Sarr | Mar. 3, 1931 |
| 2,032,899 | Zahner | Mar. 3, 1936 |
| 2,236,437 | Mackowiak | Mar. 25, 1941 |
| 2,259,365 | De Forest | Oct. 14, 1941 |
| 2,365,771 | Olson | Dec. 26, 1944 |
| 2,463,419 | Polivka | Mar. 1, 1949 |